US012791808B2

(12) United States Patent
Rodrigues et al.

(10) Patent No.: US 12,791,808 B2
(45) Date of Patent: Nov. 10, 2026

(54) BALE-CLASP COVER MECHANISM FOR A SINGLE OR DUPLEX LUCENT CONNECTOR PLUGGABLE OPTICAL TRANSCEIVER

(71) Applicant: ALTICE LABS, S.A., Aveiro (PT)

(72) Inventors: Cláudio Emanuel Rodrigues, Aveiro (PT); Daniel Filipe Correia Matos, Aveiro (PT); Luis Miguel Amaral Henriques, Aveiro (PT); Rui Jorge Morais, Aveiro (PT)

(73) Assignee: ALTICE LABS, S.A., Aveiro (PT)

(*) Notice: Subject to any disclaimer, the term of this patent is extended or adjusted under 35 U.S.C. 154(b) by 196 days.

(21) Appl. No.: 18/777,145

(22) Filed: Jul. 18, 2024

(65) Prior Publication Data

US 2025/0216620 A1 Jul. 3, 2025

(30) Foreign Application Priority Data

Dec. 28, 2023 (PT) ........................................ 119.180
May 15, 2024 (EP) ..................................... 24020153

(51) Int. Cl.
*G02B 6/42* (2006.01)

(52) U.S. Cl.
CPC ......... *G02B 6/4292* (2013.01); *G02B 6/4261* (2013.01)

(58) Field of Classification Search
CPC .. G02B 6/4261; G02B 6/4292; G02B 6/4246; G02B 6/3849
USPC ......................................... 385/88, 89, 92, 94
See application file for complete search history.

(56) References Cited

U.S. PATENT DOCUMENTS 6,425,694 B1 * 7/2002 Szilagyi ............... G02B 6/3849 385/139
6,702,477 B1 * 3/2004 Ngo ..................... G02B 6/3849 385/55
7,029,322 B2 * 4/2006 Ernst .................... G02B 6/4277 385/56
7,661,887 B2 * 2/2010 Nakagawa ........... G02B 6/4296 385/92
7,841,777 B2 * 11/2010 Howard ............... G02B 6/3825 385/94
2006/0204200 A1 * 9/2006 Lampert .............. G02B 6/3849 385/139
2007/0066248 A1 * 3/2007 Ka ....................... G02B 6/4261 455/90.3
2008/0031631 A1 * 2/2008 Ko ....................... G02B 6/4246 398/139

(Continued)

*Primary Examiner* — Robert Tavlykaev
(74) *Attorney, Agent, or Firm* — ArentFox Schiff LLP

(57) ABSTRACT

The present invention relates to a bale-clasp cover system for a single or duplex lucent connector (LC) pluggable optical transceiver comprising a bale-clasp handle, first and second covers, a U-shaped arm assembly connected to a handle and adapted to pivotally release the transceiver by activating release arm, and protruding marks in the optical transceiver top surface aligned with the LC connections. The bale-clasp cover mechanism is adapted to equip a single or duplex LC pluggable optical transceiver and to provide a quadruple mechanism of preventing light leakage, preventing the ingress of dust or other contaminants into the LC plug socket, allow the removal of the SFP optical transceiver from the housing and indicate the correct position for connecting the single LC or LC duplex optical connectors.

3 Claims, 3 Drawing Sheets

(56) References Cited

U.S. PATENT DOCUMENTS

2013/0108233 A1 * 5/2013 Lin ...................... G02B 6/3849
385/139

* cited by examiner

BALE-CLASP COVER MECHANISM FOR A SINGLE OR DUPLEX LUCENT CONNECTOR PLUGGABLE OPTICAL TRANSCEIVER

CROSS-REFERENCE TO RELATED APPLICATION

The present Application is based upon and claims the benefit of priority of the prior Portuguese Patent Application No. 119.180, filed on Dec. 28, 2023, and prior European Patent Application No. 24020153.3, filed May 15, 2024, the entire contents of which are incorporated herein by reference.

FIELD OF THE INVENTION

The present invention is enclosed in the area of pluggable optical transceivers, particularly in the field of locking and securing mechanisms, namely in the form of bale-clasp, and protection mechanisms for a single or duplex Lucent Connector (LC).

PRIOR ART

The small form-factor pluggable (SFP) is a compact, hot-swappable transceiver that serves as a connection point between a fibre optic cable and a network device. These devices can range from switches and routers to servers, optical line terminals, or optical network units.

As a compact network interface module, the SFP can support various communication standards and media types. The evolution of SFP transceivers has been driven by the increasing demand for higher bandwidth and faster data rates in optical networks.

There are several types of SFP transceivers available, each supporting different data rates. These include the standard SFP, as well as the SFP+, SFP28, SFP56, and SFP11. The type of SFP used is dependent on the data rate required by the network.

An SFP is based on the multi-source agreement small form-factor (MSA SFF) specifications, which define the physical dimensions, electrical characteristics, and optical interfaces of the transceiver. The MSA SFF specifications are developed and maintained by a group of industry vendors, to ensure interoperability and compatibility among different products. Relevant MSA SFF specifications for the SFPs include the SFF-8472, SFF-8431, SFF-8432, SFF-TA-1031, SFF-8402, and INF-8074i.

The physical dimensions of the SFP transceiver are defined by the MSA specification. According to the MSA, the SFP transceiver has the following dimensions:

Length: 56.5 mm (2.22 in)

Width: 13.4 mm (0.53 in)

Height: 8.5 mm (0.33 in)

In terms of interfaces, the SFP transceiver is equipped with a standard duplex LC connector, a standard LC connector, or a standard SC connector for the optical interface. It also features a 20-pin electrical connector for the host interface. The design of the SFP transceiver allows it to be hot-pluggable and interchangeable with other SFP modules that comply with identical specifications.

The optical connectors of the Small Form-Factor Pluggable (SFP) serve as the critical interface for the transmission of data at high speeds over fiber-optic cables.

PROBLEM TO BE SOLVED

SFP optical connectors are susceptible to dust contamination, which can lead to a degradation in signal quality and potentially cause errors or system failures. The presence of dust particles can obstruct or disperse the light beam, resulting in attenuation, reflection, or interference. Therefore, it is crucial to protect the SFP optical connectors from dust exposure.

To safeguard the impact of dust on the performance of SFP optical connectors, it is crucial to:

Always ensure that dust caps are used to cover the SFP optical connector when not in use. These caps serve as a protective barrier against dust, moisture, and physical damage.

Regular cleaning of the SFP optical connector is essential, using appropriate tools and methods.

Before inserting the optical fiber connector, inspect the SFP optical connector. Look for any dust, scratches, or defects on the connector end face.

Refrain from touching the SFP optical connector end face with your fingers or any other objects. This can introduce dust, oil, or static electricity that can potentially damage the connector.

When not in use, the optical connectors of the optical transceivers should be safeguarded with a dust plug. This prevents dust from being blown into the connector by the system fan. The risk of dust intrusion is dependent on the dustiness of the environment and the pressure of the fan, which could potentially drive dirt deep into the transceiver optical connector. If dust accumulates inside the pluggable transceiver connector, it could be pushed to the end face when an optical connector is inserted.

SUMMARY OF THE INVENTION

The present invention relates to an SFP bale-clasp with integrated dual dust covers, projected to protect the optical transceiver single and duplex LC optical connector from contamination, to secure and detach the optical transceiver module from the cage, and to protect the human eye from invisible laser radiation that may be emitted from the optical transceiver.

The preferred embodiment of the invention comprises a bale-clasp cover mechanism for a standard LC pluggable optical transceiver comprising:

a bale-clasp handle adapted to rotate around the proximal inferior edge of the optical transceiver;

two surface covers;

two spring wherein said covers are further adapted to independently rotate around the inferior edge of the handle, each comprising a spring configured to tension each cover at a 90 degrees angle against the opposite edge of handle to protect each of the duplex LC optical transceiver sockets.

Advantageously, the handle in the bale-clasp cover mechanism is adapted to rotate 90 degrees around the inferior axis of the optical transceiver's proximal edge, pivotally rotating the U-shaped assembly arm which is configured to activate the release arm and consequently releasing the optical transceiver.

Yet in the same embodiment of the invention, the bale-clasp cover mechanism may additionally comprise two triangle shaped protrusions in its superior surface of the handle, each protrusion pointing the direction of each of the duplex LC connection directions.

Due to the set of technical features that characterize the bale-clasp mechanism with an operatively coupled cover, it is possible to protect the optical transceiver single or duplex LC connector from contamination even when there is no optical fiber cable connected and provide a mechanism to insert and remove the SFP.

10—transceiver module
11—bale-clasp handle
12—bale-clasp cover
13—arm assembly in U shape
14—housing assembly
15—release arm
16—LC
17—protrusion marks
18—LC plug sockets
19—closing springs
20—Duplex LC

DETAILED DESCRIPTION

The following description is presented to enable any person skilled in the art to build and use the invention. Various modifications to the disclosed embodiments will be readily apparent to those skilled in the art. The general principles defined herein may be applied to other embodiments and applications without departing from the scope of the present invention. Thus, the present invention is not intended to be limited to the embodiments shown.

The present invention relates to a bale-clasp cover mechanism adapted for fiber optic transceivers comprising a single or duplex LC, as illustrated in FIGS. 1 to 5. The transceiver module (10) is adapted to be removable and attached to the housing assembly (14). Housing assembly (14) is to be interpreted as a conventional SFP optical transceiver housing. Said bale-clasp cover mechanism is adapted to lock the transceiver module (10) to the housing assembly (14) when in closed or locked position and release the transceiver module (10) from the housing assembly (14) when in release or opened position.

The term "bale-clasp" is to be interpreted as a type of closure mechanism that combines the features of both a bale and a clasp adapted to provide a closure so a hanging cable that needs to be attached or hung securely. Conventional latch/release mechanisms for optical modules are configured to work on a lever principle. Specifically, the tapered end or projection is on one end of the lever, and the other end of the lever is connected to the tab, actuator button or bale-clasp. When releasing or unlocking the module, the tapered end or projection is disengaged from the socket by lifting the tab, the actuator or the bale-clasp to move the tapered end or projection down and into the module housing. The module housing may then be removed from the socket by applying a force along the module housing thereby pulling the module housing out of the socket. However, removing the module housing when the lever is not in the proper position can damage the tapered end or projection and/or the socket or cage.

Figure 5:
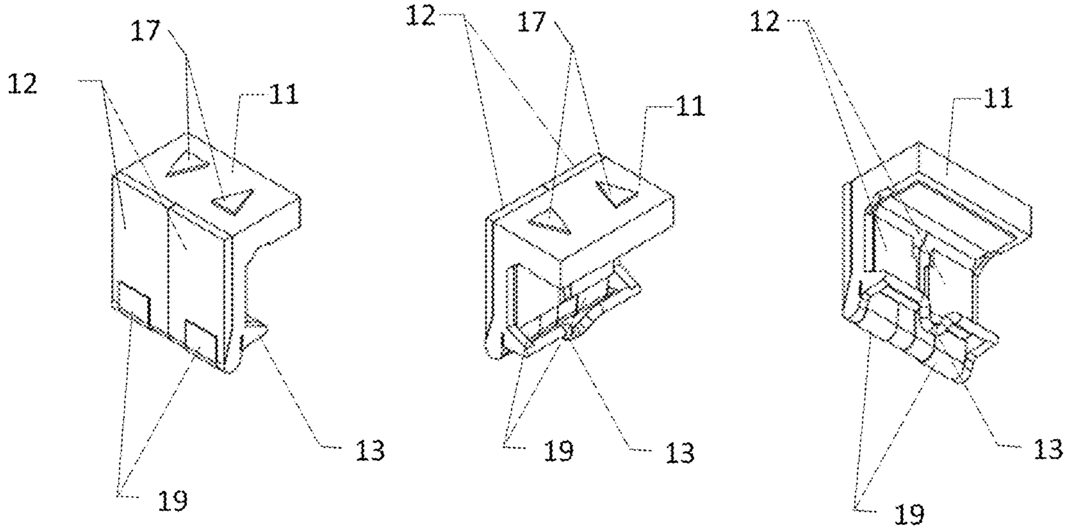
FIG. 5 depicts different views of the bale-clasp cover mechanism. The superior surface of the cover is adapted to fit the superior surface of the optical transceiver and comprises two triangle-shaped protrusions, aligned with first and second duplex LX connection directions. The bale-clasp cover mechanism further comprises two pivoting cover surfaces adapted to automatically rotate in closing direction by means of two independent springs.

According to the preferred embodiment of the invention, the bale-clasp cover mechanism is adapted to be used on a single LC (16) or duplex LC connector (20) transceiver module (10) that is removably connected to housing (14). The cover mechanism includes a bale-clasp handle (11), two covers (12), and an arm assembly protruding in U-shape (13), as shown in FIG. 5. The bale or handle (11) includes two conveniently protruding marks (17), shaped as isosceles triangles with the corner between the two equal sides pointing towards each LC socket connection direction providing means for a user to easily know the direction of the light in each single LC connector (16) or each of duplex LC connectors (20) and the SFP transceiver (10). Each of the cover surfaces (12) are operatively mounted on the bale-clasp handle (11) and are adapted to independently rotate between an open position or closed position, concerning the bale-clasp mechanism.

Figure 1:
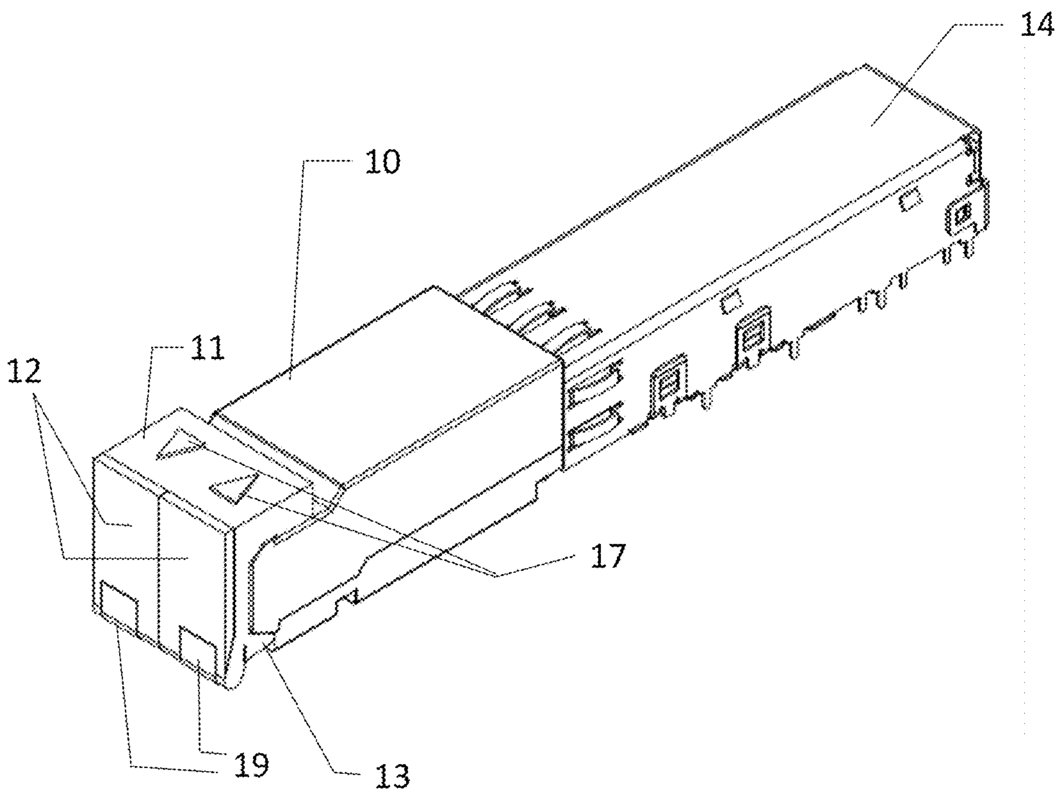
FIG. 1 shows a perspective view of an embodiment of the bale-clasp cover mechanism for a duplex LC pluggable optical transceiver in locked or closed position, mounted in a conventional housing assembly. Said handle is attached to the optical transceiver and adapted to rotate around the inferior proximal axis of the optical transceiver.
Figure 2:
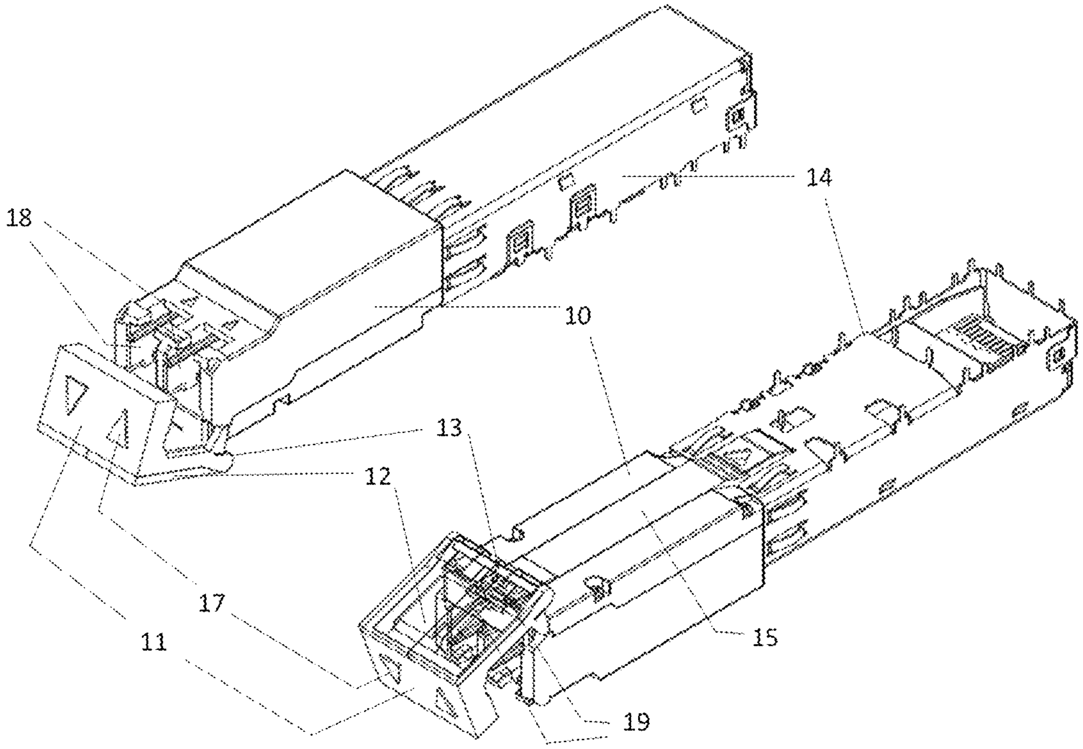
FIG. 2 depicts two perspective views of yet the same preferred embodiment of the bale-clasp cover mechanism for an optical transceiver in release or unlocked position, mounted in a conventional housing assembly. The bale-clasp handle is rotated around the inferior proximal axis of the optical transceiver pivotally activating the release arm by means of its arm assembly.

When the transceiver module (10) is removably attached to the socket opening in the housing assembly (14), the bale-clasp mechanism (11) is in the locked or closed position (FIG. 1). In said closed position, it is not possible to connect the single LC (16) or duplex LC (20) or access any of the LCs plug sockets (18) in any other way, by means of cover surface (12) acting as a protecting or blocking mechanism. Conversely, when the bale-clasp handle (11) is in its closed position and the cover (12) is rotated 90 degrees in the upwards direction (FIG. 3), i.e., said opened or released position, the user can advantageously access the LC plug sockets (18) and establish a single LC connection (16) or duplex LC connection (20), as show in FIGS. 3 and 4, respectively.

In case the optical module (10) is in the socket position of housing (14) and handle (11) is in its closed or locked position (FIG. 1, 3 or 4), the optical transceiver is locked to the housing assembly (14) by means of the bale-clasp mechanism.

Figure 3:
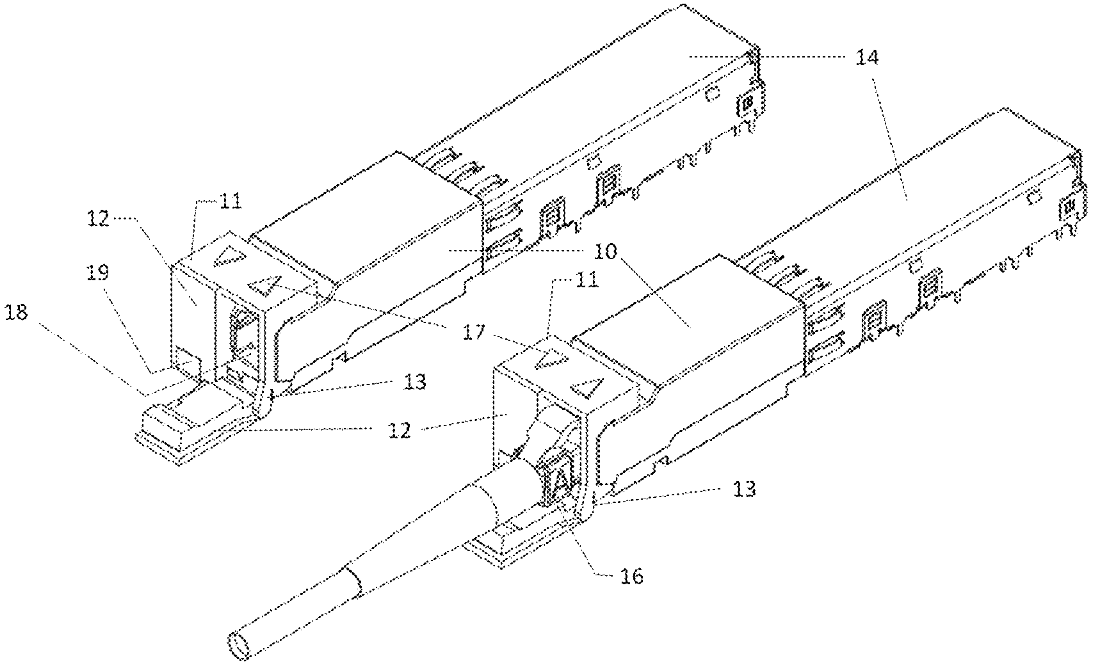
FIG. 3 shows a perspective view of an embodiment of the bale-clasp cover mechanism for a duplex LC pluggable optical transceiver, wherein the first cover is in closed position, protecting the first LC socket in the optical transceiver and second cover is opened, allowing the second LC socket to be connected by an LC.

In case the optical module (10) is housing socket (14), handle (11) is in its closed or locked position position but one of covers (12) is 90 degrees rotated around the handle inferior axis, i.e. opened position, the user can access the LC plug bay (18) to connect a single LC connector (16), as shown in FIG. 3.

Figure 4:
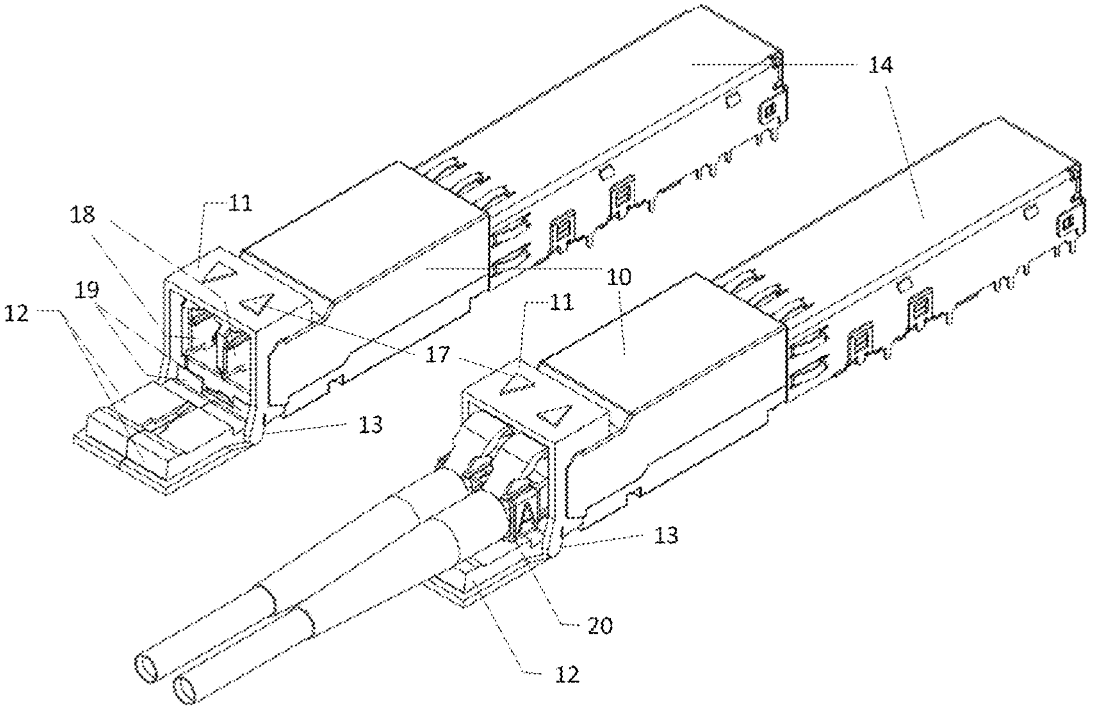
FIG. 4 is a perspective view of an embodiment of the transceiver module with the bale-clasp cover mechanism in release or opened position and two LCs connected in each of the transceiver LC sockets. The bale-clasp cover is rotated by 90 degrees around the proximal inferior edge of the optical transceiver in a way that the LCs are able to connect to each LC socket in the optical transceiver. Said cover is in opened position.

In case transceiver module (10) is fitted in housing assembly (14), the bale-clasp handle (11) is in its closed or locked position and both covers (12) are 90 degrees rotated, i.e., open position, the user can access the LC plug bays (18) to connect a duplex LC connector (20), as shown in FIG. 4.

Conversely, when the bale-clasp mechanism cover (12) is 90 degrees rotated in the downwards direction around the inferior edge of the optical transceiver (10) (FIG. 2) with regard to the bale-clasp handle (11), the protruding arm assembly (13) is simultaneously rotated 90 degrees in the same direction and acts on the release arm (15), pivotally pushing it towards the housing assembly (14), thus releasing the transceiver module (10) from the housing assembly (14).

The bale-clasp cover mechanism is further provided with first and second springs (19) adaptably mounted to act on first and second surfaces of cover (12). Said springs (19) are independently mounted between the bale-clasp handle (11) and each covers (12), as shown in FIG. 5. Advantageously, first and second closing springs (19) work in tension with the first and second covers (12) and continuously push said first and second covers (12) to a closing position (FIG. 3). First and second closing springs (19) need to be acted for the insertion of a single LC (16) or duplex LC (20) on the LCs plug sockets (18).

It should be noted that the bale-clasp handle (11) is not able to complete the necessary rotation to release the transceiver module (10) unless any installed LC connector (16) has been removed from the LC plug sockets (18) of the transceiver module (10). This feature provides a failsafe method for assuring that the transceiver module (10) cannot be removed from the housing (14) while the LC connector (16) is in position, thereby avoiding inadvertent data transmission interruption.

The exemplary embodiment of the bale-clasp cover mechanism and its U-shaped arm assembly (13) are further adapted to prevent light leakage, prevent dust or other contaminants insertion into the LC plug socket (18), and to detachably remove the SFP optical transceiver (10) from the housing assembly (14).

Said first and second covers (12), as described according to the exemplary embodiments of the invention, are used to protect against the leakage of emitted light from a light-emitting diode (LED), a laser diode (LD), or another light-emitting device.

As will be clear to one skilled in the art, the present invention should not be limited to the embodiments described herein, and several changes are possible that remain within the scope of the present invention.

Of course, the preferred embodiments shown above are combinable, in the different possible forms, being herein avoided the repetition of all such combinations.

The invention claimed is:

1. A bale-clasp cover mechanism for a single or duplex LC pluggable optical transceiver comprising:

a bale-clasp handle adapted to rotate around a proximal inferior edge of the optical transceiver;

first and second surface covers; and first and second springs;

wherein, the first and second covers are further adapted to independently rotate around an inferior edge of the handle and first and second springs are configured to respectively tension the first and second covers at a 90 degrees angle against an opposite edge of handle to protect LC sockets of the optical transceiver.

2. A bale-clasp cover mechanism for the single or duplex LC pluggable optical transceiver according to claim 1, wherein the handle further comprises a U-shaped assembly arm operatively mounted in the handle configured to synergistically rotate downwards activating a release arm to release the optical transceiver.

3. A bale-clasp cover mechanism for the single or duplex LC pluggable optical transceiver according to claim 1, wherein the handle comprises a two protrusion marks in its top surface, shaped as triangles, triangle-shaped protrusions having one corner aligned with each of LC sockets connection direction.

* * * * *